Nov. 28, 1950   J. W. GOSS   2,532,162
OBJECT SUPPORTING MEANS
Filed Jan. 9, 1948
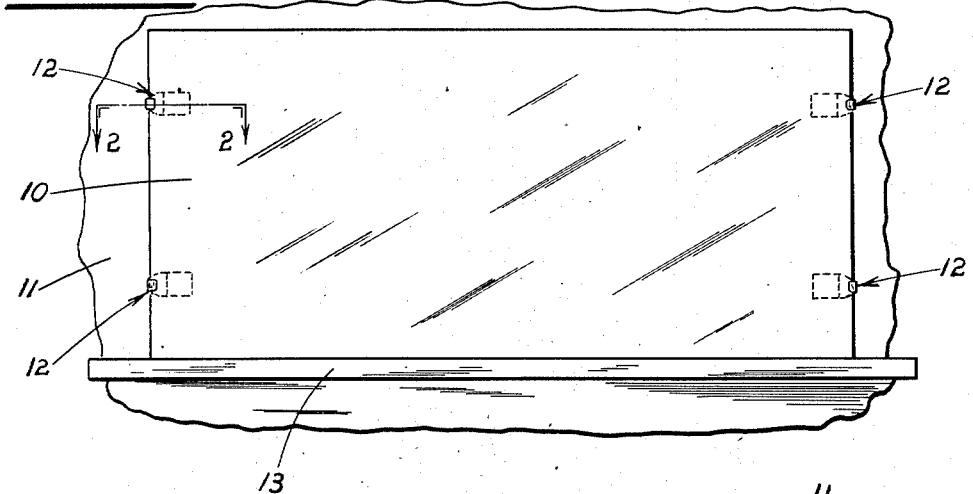
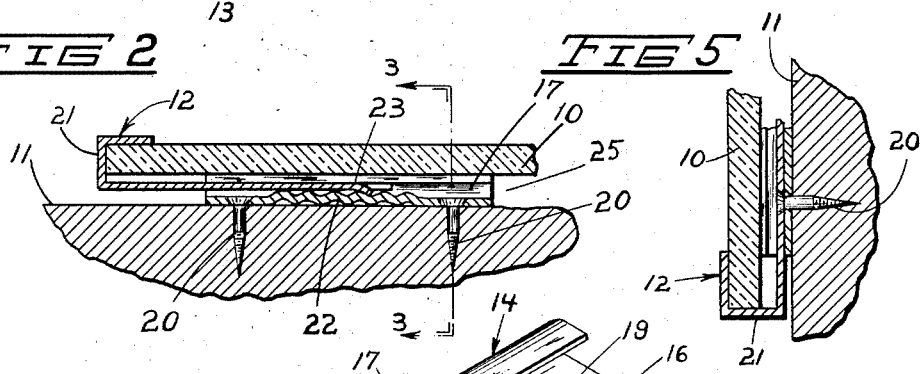
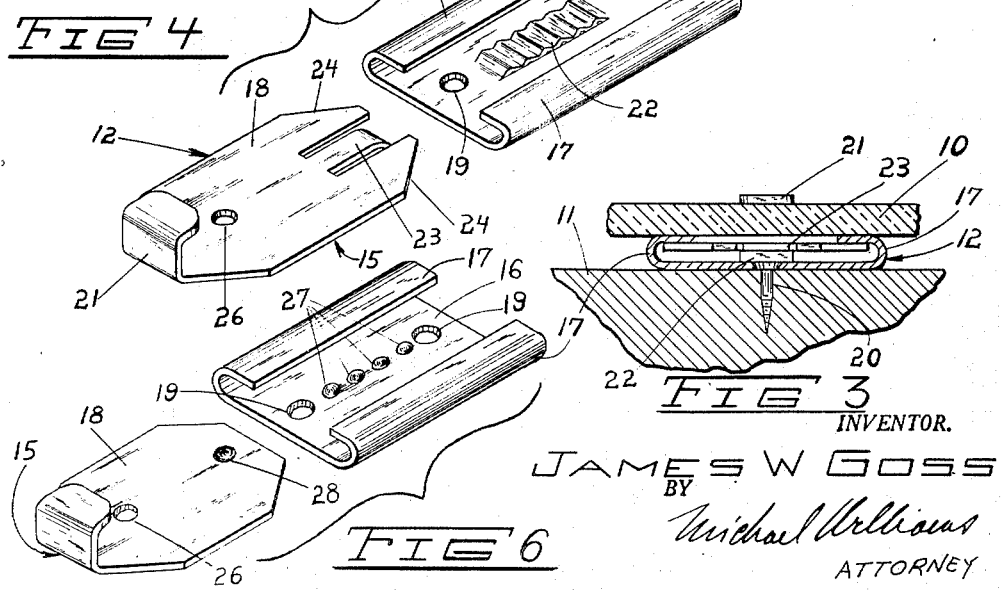
INVENTOR.
JAMES W GOSS
BY Michael Williams
ATTORNEY Patented Nov. 28, 1950

2,532,162

UNITED STATES PATENT OFFICE 2,532,162

OBJECT SUPPORTING MEANS

James W. Goss, Warren, Ohio

Application January 9, 1948, Serial No. 1,429

3 Claims. (Cl. 248—30)

My invention relates to object supporting means, more particularly to means for supporting objects such as mirrors, pictures, and the like, from surfaces such as a wall and the like, and the principal object of my invention is to provide new and improved means of this kind.

Many devices have heretofore been proposed for the hanging or mounting of objects on a surface, but each possesses disadvantages that have restricted its commercial success.

In hanging pictures and small mirrors, a commonly used method was to secure picture wire to the back of the object, and hook such wire over a hook or nail secured to the supporting surface. This usually resulted in an amateurishly appearing performance, since great care needs to be exercised in positionment of the hook or nail in centered relation with respect to the wall space and in proper height relation with respect to the object and the amount of sag in the supporting wire. If the object was not properly centered, it was required to remove the hook or nail, and re-position it, resulting in unsightly holes in the supporting surface.

This method was not appropriate for hanging heavier objects, such as large mirrors, especially where it was desired that the mirror be substantially close to and parallel with the wall. In such instance, it was common to drill holes in the mirror at spaced planes inwardly of the peripheral margin, for the purpose of passing fastening screws which engage with the supporting surface.

Such method of securing mirrors and the like was not highly desired, since great care had to be exercised in drilling the holes to avoid breaking of the mirror, and this involved considerable time and expense. Then again, great care had to be exercised in positioning the mirror, since once the fastening screws were driven home, no further centering adjustment could be made.

My invention makes it possible to hang an object, such as a mirror, picture, and the like, to a supporting surface such as a wall, with a minimum expenditure of time and effort, and with no danger of breaking or damaging the object, and further provides means for centering or further adjusting the object once it is in position on the supporting surface.

In the drawing accompanying this specification and forming a part of this application, there is shown, for purposes of illustration, embodiments which my invention may assume, and in this drawing:

Figure 1 is a broken elevational view showing an embodiment of my invention in use for hanging a mirror, Figure 2 is an enlarged fragmentary sectional view corresponding generally to the line 2—2 of Figure 1, Figure 3 is a fragmentary transverse sectional view corresponding generally to the line 3—3 of Figure 2, Figure 4 is a separated perspective view of members comprising the embodiment shown in Figures 1 through 3, Figure 5 is a fragmentary sectional view of the embodiment as used to provide a solid support, and Figure 6 is a separated perspective view of members comprising another embodiment of the invention.

Generally, my invention comprises a device including connectable members adapted to have relative movement when connected, one member being adapted to be secured to a supporting surface and the other member being adapted to engage the object, and means restricting free relative movement of such members. A plurality of such devices are preferably positioned at spaced points adjacent to the periphery of the object, between the object and the surface and substantially hidden from sight, the relative movement of members of respective devices providing for adjustment of the object relative to the surface.

Referring particularly to Figures 1 through 4, an embodiment of my invention is shown as used for the purpose of securing a relatively large mirror 10 in position on a wall 11. It is pointed out that the object may be other than a mirror, and may have a shape other than rectangular.

As shown in Figure 1, the mirror 10 is adapted to rest on a ledge surface 13, and therefore a plurality of devices 12 (such as the four shown in Figure 1) are here used to hold the mirror 10 at its side edges only.

Each device comprises members 14 and 15, the member 14 being adapted to be secured to the wall 11, and the member 15 being adapted for engagement with the mirror 10. As here shown, the member 14 comprises a relatively flat body 16 having overturned margins forming side flanges 17 adapted to slidably receive side surfaces of a relatively flat body 18 of the member 15.

The body 16 is here formed with spaced countersunk apertures 19 adapted to pass flat head screws 20 for the purpose of securing the member 14 to the wall 11. It will be appreciated that other types of fastening means may be used as conditions dictate. The body 15 is formed with a hook or finger 21 adapted to engage around a marginal portion of the mirror, as best seen in Figure 2. In some cases, it may be advantageous to line the mirror engaging surface of the hook 21 with a resilient material, such as felt, to insure against damage to the mirror.

Each device 12 comprises means to restrict free sliding action of the members 14, 15, and in the embodiment shown in Figures 1 through 5, such means comprises detent means formed by a corrugated or other abutment providing surface 22 on the body 16, disposed in line with relative movement of the members, and a spring finger 23 formed on the body 18. It will be appreciated that the finger 23 is resiliently positionable in any one of the troughs of the corrugated surface 22, to releasably hold the members 14, 15 against relative movement. The body 18 may have angular entrance margins 24 to facilitate insertion of its side surfaces to position within the side flanges 17.

To position and secure an object, such as the mirror 10 the respective members 14 are secured to a surface, such as the wall 11, in position determined by an approximation of the desired position of the mirror. The mirror may then be set in place, and the members 15 inserted within respective members 14 to a point where the hooks or fingers 21 engage with the respective marginal portions of the mirror.

After inspection, if it is found necessary to shift the mirror to the right or the left, as viewed in Figure 1, in order to properly center it with the wall space, it is merely necessary to back out the members 15 from respective members 14 on one side of the mirror, and advance the members 15 into respective members 14 on the other side of the mirror, until the mirror is perfectly centered. Once in proper position, the interengaging detent means 22, 23 will hold the mirror against accidental shifting.

To remove the mirror, for any reason, it is merely necessary to sufficiently back out the members 15 on one side of the mirror, so that the mirror may be shifted to clear the hooks 21. The devices 12, as best seen in Figures 2 and 3, are relatively flat, and are interposed between the mirror and the wall substantially hidden from sight. However, a slight space 25 is provided between the mirror and the wall, and this is desirable, since it provides for air circulation and prevents fogging of the mirror.

In some cases, a ledge 13 is not available, or if available it may be desired to position the mirror removed from the ledge. In such case, devices 12 may be positioned along the lower margin of the mirror. In the event that the mirror is heavy, and it is feared that the holding action of the interengaging detent means 22, 23 is insufficient to support the weight of the mirror, a fastening element 19 may be passed through an aperture 19 in the body 14 and an aperture 26 formed in the body 18 of the member 15, as shown in Figure 5. Such assembly positively prevents relative movement of the members 14, 15, and provides a firm ledge on which the lower margin of the mirror may be supported.

The embodiment of the invention shown in Figure 6 is substantially like the embodiment hereinbefore described, and similar parts will be referred to by the same reference numerals. In this case, however, the corrugated surface on the body 14 is replaced by a series of upwardly struck projections 27, and the spring finger 23 is replaced by a projection 28 struck downwardly from the body 15.

The resiliency of the body 15 will permit the projection to be forcibly moved over the projections 27, yet will provide enough holding force so that the projection 28 will be firmly seated between any selected two adjoining projections 27, to prevent accidental relative movement of the members 14 and 15.

From the foregoing, it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A device for supporting an object such as a mirror, picture, and the like, comprising: a first member, generally flat, and adapted to be secured flatwise to a support, said first member having opposite side margins turned over to form a pair of spaced grooves opening at at least one end margin of said first member; a second member, generally flat, and assembleable with said first member by inserting it within said grooves from said end margin, and being held to flatwise sliding action relative to said first member by guiding action of the surfaces defining said grooves, said second member having means for engaging said object; and detent means comprising a corrugated surface on the flat portion of said first member and a resilient tongue on the flat portion of said second member and adapted to selectively seat in any one of the troughs formed by said corrugated surface to thereby yieldably hold said first and second members in any one of a number of adjusted positions.

2. Means for releasably securing an object such as a mirror, picture, and the like to a support, such as a wall, blackboard and the like, comprising: a plurality of devices, each comprising a relatively flat first member adapted to be secured to said support in position so that said first members lie flat against said support and are spaced-apart generally in accordance with the spacing of marginal surfaces of said object, but disposed within such spacing and thus generally hidden from sight by said object when it is secured in place; and each of said devices also comprising a second member held to slidable movement generally flat-wise with a respective first member, each of said second members having a hook adapted to engage over an adjacent marginal surface of said object and thus hold said object assembled with said support; said second members being adjustable with respect to respective first members to thereby provide for ready assembly of said object after said first members are secured to said support and to thereby further provide for lateral adjustment of said object relative to said support after said object has been assembled with said support.

3. Means for releasably securing an object such as a mirror, picture, and the like to a support, such as a wall, blackboard and the like, comprising: a plurality of devices, each comprising a relatively flat first member adapted to be secured to said support in position so that said first members lie flat against said support and are spaced-apart generally in accordance with the spacing of marginal surfaces of said object, but disposed within such spacing and thus generally hidden from sight by said object when it is secured in place; and each of said devices also comprising a second member held to slidable movement generally flat-wise with a respective first member, each of said second members having a hook adapted to engage over an adjacent marginal surface of said object and thus hold said object assembled with said support; said second members being adjustable with respect to respective first members to thereby provide for ready assembly of said object after said first members are secured to said support and to thereby further provide for lateral adjustment of said object relative to said support after said object has been assembled with said support; and each of said devices having detent means for yieldably holding respective first and second members in any one of a number adjusted positions.

JAMES W. GOSS.

REFERENCES CITED

The following references are of record in the file of this patent:

UNITED STATES PATENTS

| Number | Name | Date |
|---|---|---|
| 694,049 | Auer | Feb. 25, 1902 |
| 858,056 | Bloomer | June 25, 1907 |
| 1,024,349 | Mattern | Apr. 23, 1912 |
| 1,298,337 | Hale | Mar. 25, 1919 |
| 1,453,502 | Hinderliter | May 1, 1923 |
| 1,845,686 | Stewart | Feb. 16, 1932 |
| 1,966,505 | Keefe | July 17, 1934 |
| 2,079,816 | Rose | May 11, 1937 |
| 2,185,385 | Rose | Jan. 2, 1940 |
| 2,306,023 | Lumley | Dec. 22, 1942 |

FOREIGN PATENTS

| Number | Country | Date |
|---|---|---|
| 313,544 | Great Britain | 1929 |